United States Patent
Fujioka et al.

(10) Patent No.: US 8,639,087 B2
(45) Date of Patent: Jan. 28, 2014

(54) MOVING IMAGE EDITING SYSTEM AND MOVING IMAGE EDITING METHOD

(75) Inventors: Yoshihide Fujioka, Kobe (JP); Takumi Hirose, Kobe (JP); Toshifumi Egusa, Kobe (JP); Toshiyuki Tanaka, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 726 days.

(21) Appl. No.: 12/227,676

(22) PCT Filed: May 28, 2007

(86) PCT No.: PCT/JP2007/000568
§ 371 (c)(1),
(2), (4) Date: Nov. 24, 2008

(87) PCT Pub. No.: WO2007/141906
PCT Pub. Date: Dec. 13, 2007

(65) Prior Publication Data
US 2009/0148126 A1    Jun. 11, 2009

(30) Foreign Application Priority Data
May 29, 2006    (JP) ................................. 2006-148378

(51) Int. Cl.
*H04N 5/77* (2006.01)
(52) U.S. Cl.
USPC .......................................... 386/224; 386/278
(58) Field of Classification Search
USPC .................. 386/200, 241, 278, 281
See application file for complete search history.

(56) References Cited

U.S. PATENT DOCUMENTS

| | | | | |
|---|---|---|---|---|
| 5,438,423 A * | 8/1995 | Lynch et al. | ................. | 386/295 |
| 5,732,184 A * | 3/1998 | Chao et al. | ................... | 386/282 |
| 5,930,446 A | 7/1999 | Kanda | | |
| 6,118,923 A * | 9/2000 | Rodriguez | ................... | 386/241 |
| 6,763,177 B1 | 7/2004 | Abe et al. | | |
| 6,965,701 B2 * | 11/2005 | Tojo | ............... | 382/239 |
| 2002/0131767 A1 | 9/2002 | Auwens et al. | | |

FOREIGN PATENT DOCUMENTS

| | | |
|---|---|---|
| EP | 1180769 | 2/2002 |
| JP | 9-18752 | 1/1997 |
| JP | 2002109863 A | 4/2002 |
| JP | 2004015437 A | 1/2004 |
| WO | WO 97/39411 | 10/1997 |

OTHER PUBLICATIONS

Search Report Dated Sep. 28, 2007.

(Continued)

*Primary Examiner* — Huy T Nguyen
(74) *Attorney, Agent, or Firm* — Arent Fox LLP

(57) ABSTRACT

A moving image editing method uses a recorder apparatus and an editor apparatus. The recorder apparatus records into a recording unit by use of a file format in which index data, which includes the reproduction information of the data of the frames of moving image data, is written after that data of the frames of the moving image data. According to the moving image editing method, while the data of the frames of the moving image data being recorded into the recording unit, the index data related to the data of frames already written in the editor apparatus is transferred from the recorder apparatus to the editor apparatus. The editor apparatus reads, based on the index data, the data of the frames of the writing file so as to perform a real time edition of the moving image data.

10 Claims, 12 Drawing Sheets

(56) References Cited

OTHER PUBLICATIONS

Office Action in Japanese Application No. 2008-554956 mailed Jul. 10, 2012.

Abstract of JP 2004015437 published Jan. 15, 2004.
Abstract of JP 2002109863 published Apr. 12, 2002.
International Preliminary Report on Patentability, PCT Application No: PCT/JP2007/000568, WIPO, Geneva, Switzerland, Mar. 12, 2008.

* cited by examiner

A  AVI FILE BEING CREATED          TEMPORARY INDEX FILE

B

A

B

MOVING IMAGE EDITING SYSTEM AND MOVING IMAGE EDITING METHOD

This application claims the benefit, under 35 U.S.C. §365 of International Application PCT/JP2007/000568, filed May 28, 2007, which was published in accordance with PCT Article 21(2) on Dec. 13, 2007 in English and which claims the benefit of Japanese patent application No. 2006-148378, filed May 29, 2006.

TECHNICAL FIELD

This invention relates to a moving image editing system and a moving image editing method.

BACKGROUND ART

Japanese Patent Application Publication No. H09-018752 discloses an online real-time MPEG-2 nonlinear video editing system for use in the news report producing systems of television stations.

On the other hand, nonlinear video edition using Audio Video Interleaving (AVI) files is widely known today. The AVI files as well as WAV files of sound and music are of Windows (registered trademark) standard format and are widely used because they can be used in various compression and non-compression formats such as non-compressed AVI, DV AVI, MPEG-4 AVI, DivX AVI and WMV AVI.

The inventors have contemplated that a real-time edition using AVI files may be performed in an AVI editing system 100 as shown in FIG. 1. The AVI editing system 100 comprises a plurality of recorders 101, 102 and 103, a recording unit 110 and a plurality of editors 121, 122 and 123. The recorders 101, 102 and 103 convert their respective captured audiovisual (AV) data to AVI format and transfer them to the recording unit 110, which then sequentially stores them. When the AV data have been stored as AVI files in the recording unit 110, each of the editors 121, 122 and 123 can read any desired AVI file to create a desired edited AVI file.

DISCLOSURE OF INVENTION

Technical Problem

However, the AVI editing system 100 has a problem as follows. Each of the editors 121-123 cannot start its edition until a given time of AV data from the recorders 101-103 has been transferred to and recorded as AVI files in the recording unit 110. This is because the data format of AVI files is such that an index data related to the given time of AV data (which will be referred to as "real data" hereinafter) is added to the end of the real data and hence, if the reproduction time of a particular file is, for example, ten minutes, then the real data is recorded into the recording unit 110 in ten minutes, thereafter the index data is given from the recorders 101-103, thereby completing the recording of the real data as the particular file.

Thus, although the AVI file format has an advantage that real data can be sequentially captured and recorded, yet it has the problem that the real data, though being existent, cannot be edited during the capturing process.

Not only the AVI file format but also any other data format, in which a set of indexes exists somewhere in a file, has the same or similar problem.

In view of the above problem, the present invention is directed to an editing system that allows AV data, the format of which is such that a set of index data is stored somewhere in a file, to be edited even before the transferring of the AV data has been completed.

Technical Solution

According to an aspect of the present invention, there is provided a moving image editing system comprising: a recorder for receiving moving image data and causing a recording means to record the moving image data in a predetermined format; and an editor for reading and editing a file of the predetermined format recorded in the recording means; wherein when causing the moving image data to be recorded in a writing file, the recorder additionally writes index information, which includes reproduction information of the recorded moving image data, into a temporary index file associated with the writing file; and the editor reads, based on the additionally written information of the temporary index file, the data of the frames of the writing file to perform a moving image data edition.

According to another aspect of the invention, there is provided a recorder for receiving moving image data and causing a recording means to record the moving image data in a predetermined format, wherein when causing the moving image data to be recorded in a writing file, the recorder additionally writes index information, which includes reproduction information of the recorded moving image data, into a temporary index file associated with the writing file.

According to still another aspect of the invention, there is provided an editor for reading, from a recording means in which moving image data of a predetermined format is recorded, and editing the moving image data, wherein the recording means records a writing file having the moving image data and also records a temporary index file which is associated with the writing file and in which index information including reproduction information of the recorded moving image data is additionally written; and the editor reads, based on the information of the temporary index file, the data of the frames of the writing file to perform a moving image data edition.

According to still another aspect of the invention, there is provided a moving image editing method for recording moving image data and reading and editing the moving image data, comprising the steps of: receiving moving image data and causing a recording means to record the moving image data in a predetermined format; when causing the moving image data to be recorded in a writing file, additionally writing index information, which includes reproduction information of the recorded moving image data, into a temporary index file associated with the writing file; and reading, based on the additionally written information of the temporary index file, the data of the frames of the writing file to perform a moving image data edition.

According to still another aspect of the invention, there is provided a moving image editing method for recording moving image data and reading and editing the moving image data, comprising the steps of: receiving moving image data and causing a recording means to record the moving image data in a predetermined format; when causing the moving image data to be recorded in a writing file, acquiring index information including reproduction information of the recorded moving image data; and reading, based on the acquired index information, the data of the frames of the writing file to perform a moving image data edition.

An AVI format moving-image editing system comprises a plurality of recorders that capture moving image data and record the captured moving image data into a recording unit in an AVI file format; and a plurality of editors that read and edit AVI files recorded in the recording unit and that have a time line for displaying frames, which are to be edited, in a time sequence of reproduction. Each of the recorders causes the recording unit to determine a writing filename, open the file thereof and then record, into the file, moving image data, which is to be written as real data, in a frame sequence. When completing the transferring of the final frame of the real data, the recorder causes an index data including reproduction information of the frames to be recorded and then causes the file to be closed, thereby completing the recording of the AVI file of the writing filename. When causing the recording unit to record the moving image data in the writing file in the frame sequence, the recorder opens a temporary index file associated with the writing file, and then additionally writes the index data, which includes reproduction information of the transferred real data, into the temporary index file at predetermined time intervals. When each of the editors reads the data of the frames of the writing file, if no index data of the frames is existent in the writing file, the editor searches for the temporary index file associated with the writing file. If the temporary index file is existent, the editor stores the temporary index file into a memory and reads the data of the frames of the writing file, and determines, at predetermined time intervals, whether an index data is additionally written in the temporary index file. If the index data is additionally written therein, the editor updates the storage in the memory and then updates, based on the total number of frames of the updated temporary index file, the displaying of the time line.

Thus, when the moving image data is recorded into the writing file in the frame sequence, the temporary index file associated with the writing file is additionally opened, the index data, which includes the reproduction information of the transferred real data, is additionally written into the temporary index file at the predetermined time intervals. Therefore, before the index data, which includes the reproduction information of the frames, is recorded into the writing file, the index data can be additionally written into the temporary index file at the predetermined time intervals.

If the temporary index file is existent, it is stored into the memory, and the data of the frames of the writing file is read. Therefore, even in the case of a data format in which a set of indexes is existent somewhere in a file, a real-time edition can be performed while the recorder is recording the moving image.

It is determined, at predetermined time intervals, whether an index data is additionally written into the temporary index file. If the index data is additionally written thereinto, the storage in the memory is updated, thereafter the displaying of the time line is updated based on the total number of the frames of the updated temporary index file. This allows the operator to know that the index data is additionally written into the temporary index file.

A moving image editing system comprises a recorder for recording, into a recording unit, a moving image data in a file format in which an index data, which includes reproduction information of the data of the frames of the moving image data, is written after that data of the frames; and an editor for reading and editing a file of the predetermined file format recorded in the recording unit. When causing the recording unit to determine a writing file name, open the file thereof, add frame IDs to the moving image data to be written as real data into the file, and record the moving image data, the recorder additionally opens a temporary index file associated with the writing file, and additionally writes an index data, which includes reproduction information of the transferred real data, into the temporary index file at predetermined time intervals. When the editor reads the data of the writing file, if no index data of the frames is existent in the writing file, the editor searches for the temporary index file associated with the writing file. If the temporary index file is existent, the editor stores the temporary index file into a memory and reads the data of the frames of the writing file, and further determines, at predetermined time intervals, whether an index data is additionally written in the temporary index file. If the index data is additionally written therein, the editor updates the storage in the memory.

Thus, while the moving image data is recorded into the writing file, the temporary index file associated with the writing file is additionally opened, the index data, which includes the reproduction information of the transferred real data, is additionally written into the temporary index file. Therefore, before the index data, which includes the reproduction information of the frames, is recorded into the writing file, the index data can be additionally written into the temporary index file.

If the temporary index file is existent, the editor stores the temporary index file into a memory and reads the data of frames of the writing file. Therefore, even in the case of a data format in which a set of indexes is existent somewhere in a file, a real-time edition can be performed while the recorder is recording the moving image.

A recorder records, into a recording part, a moving image data in a file format in which an index data, which includes reproduction information of the data of the frames of the moving image data, is written after that data of the frames. When causing the recording part to determine a writing filename, open the file thereof, add frame IDs to moving image data to be written as real data into the file, and record the moving image data, the recorder additionally opens a temporary index file associated with the writing file, and additionally writes an index data, which includes the reproduction information of the transferred real data, into the temporary index file at predetermined time intervals. Therefore, before the index data, which includes the reproduction information of the frames, is recorded into the writing file, the index data can be additionally written into the temporary index file.

Another recorder writes an index data, which includes reproduction information of a real data, at the end of the writing file, and closes the file. The recorder determines whether there exist any editors that are currently referring to the temporary index file. If no, the recorder deletes the temporary index file. Therefore, if there exist any editors that are currently referring to the temporary index file, those editors can refer to this file to perform an edition. If the writing file is to be edited anew, the editor can perform its edition with reference to the index data existing at the end of the file in a usual manner.

An editor reads and edits a file from a recording part that records a moving image data in a file format in which an index data, which includes reproduction information of the data of the frames of the moving image data, is written after that data of the frames. The recording part includes both a writing file in which the real data of the moving image data is stored and a temporary index file associated with the writing file when the moving image data is recorded into the writing file with frame IDs added to the moving image data. When the editor reads the data of the writing file, if no index data of the frames is existent in the writing file, the editor stores, into the memory, reproduction information stored in the temporary index file associated with the writing file, and reads the data of the frames of the writing file, and further determines, at predetermined time intervals, whether an index data is additionally written in the temporary index file. If the index data is additionally written therein, the editor updates the storage in the memory. Therefore, even in the case of a data format in which a set of indexes is existent somewhere in a file, a real-time edition can be performed. If the temporary index file has been updated, the edition can be performed based on the updated index data.

Another editor displays, on a screen, a time line in which the read frames are arranged in a time sequence of reproduction. If an index data is additionally written in the temporary index file, the editor updates the storage in the memory, and further updates, based on the total number of the frames of the updated temporary index file, the display of the time line. Therefore, the operator is allowed to know that the index data has been additionally written into the temporary index file.

Another editor determines whether any data indicative of a duration is existent in the writing file. If there exists a data indicative of a duration, the editor changes, based on the total number of the frames of the updated temporary index file, the ratio of the frames having been arranged on the time line to the frames having not been arranged yet thereon, and then displays them thereon. If there exists no data indicative of a duration, the editor displays, based on the total number of the frames of the updated temporary index file, no mark indicative of the final frame, thereby updating the displaying of the time line. Therefore, whether the data indicative of a duration is existent or not, the operator is allowed to know that the index data has been additionally written.

Another moving image editing system comprises a recorder for recording, into a recording unit, a moving image data in a file format in which an index data, which includes reproduction information of the data of the frames of the moving image data, is written after that data of the frames; and an editor for reading and editing a file of the predetermined file format recorded in the recording unit. When receiving, from the editor, a read request for reading the moving image data of the writing file while causing the recording unit to determine the writing filename, open the file, add frame IDs to moving image data to be written as real data, and record the moving image data into the opened file, the recorder transfers, to the editor, the index data including the reproduction information related to the moving image data having already been written. The editor then reads, based on the index data, the data of the frames of the writing file. Therefore, before the index data including the reproduction information of the frames is recorded into the writing file, a real-time edition can be performed.

A moving image editing method uses a recorder for recording, into a recording part, a moving image data in a file format in which an index data, which includes reproduction information of the data of the frames of the moving image data, is written after that data of the frames; and an editor for reading and editing a file of the predetermined file format recorded in the recording part. While recording the data of the frames of the moving image data into the recording part, the recorder additionally writes an index data, which includes reproduction information of transferred real data, into a temporary index file associated with the writing file at predetermined time intervals. When reading the data of the frames of the writing file being currently recorded, the editor reads the temporary index file associated with the writing file into the memory, and also reads the data of the frames of the writing file, and further determines, at predetermined time intervals, whether an index data is additionally written in the temporary index file. If the index data is additionally written therein, the editor updates the storage in the memory. Therefore, before the index data including the reproduction information of the frames is recorded into the writing file, a real-time edition can be performed.

A program for use in recorders causes a recorder, which records, into a recording part, a moving image data in a file format in which an index data, which includes reproduction information of the data of the frames of the moving image data, is written after that data of the frames, to execute the steps of: causing the recording part to determine a writing filename and open the file thereof; when causing the recording part to record the moving image data to be written as real data into the file with frame IDs added to the moving image data, additionally opening a temporary index file associated with the writing file; and additionally writing an index data, which includes reproduction information of the transferred real data, into the temporary index file at predetermined time intervals.

Therefore, before the index data including the reproduction information of the frames is recorded into the writing file, the index data can be additionally written into the temporary index file.

A program for use in editors causes an editor, which reads, from a recording part, and edits a file of a moving image data having a file format in which an index data, which includes reproduction information of the data of the frames of the moving image data, is written after that data of the frames, to execute the steps of: when reading the data of the writing file, if no index data of the frames is existent in the writing file, then storing, into a memory, reproduction information stored in a temporary index file associated with the writing file; reading the data of the frames of the writing file with reference to the reproduction information; determining, at predetermined time intervals, whether an index data is additionally written in the temporary index file; and, if the index data is additionally written therein, then updating the storage in the memory. Therefore, a real-time edition can be performed. If the temporary index file is updated, the edition can be performed based on the updated index.

A moving image real-time editing method uses a recorder for recording, into a recording part, a moving image data in a file format in which an index data, which includes reproduction information of the data of the frames of the moving image data, is written after that data of the frames; and an editor. According to this editing method, an index data related to the data of the frames, which has already been written into the editor, is transferred from the recorder to the editor while the data of the frames of the moving image data is currently being recorded into a recording part. The editor then can read, based on the index data, the data of the frames of the writing file to perform an edition of the moving image data. Therefore, before the index data including the reproduction information of the frames is recorded into the writing file, a real-time edition can be performed.

A moving image editing system comprises a recorder for recording, into a recording unit, a moving image data in a file format in which an index data, which includes reproduction information of the data of the frames of the moving image data, is written after that data of the frames; and an editor for reading and editing a file of the predetermined file format recorded in the recording unit. When causing the recording unit to determine a writing filename, open the file thereof, add frame IDs to moving image data to be written as real data, and record the moving image data into the file, the recorder additionally opens a temporary index file associated with the writing file, and additionally writes an index data, which includes reproduction information of the transferred real data, into the temporary index file at predetermined time intervals. When the editor reads the data of the writing file, if no index data of the frames is existent in the writing file, the editor searches for the temporary index file associated with the writing file. If the temporary index file is existent, the editor stores the temporary index file into a memory and reads the data of the frames of the writing file.

Thus, when the moving image data is recorded into the writing file, the temporary index file associated with the writing file is additionally opened, and the index data including the reproduction information of the transferred real data is additionally written into the temporary index file. Therefore, before the index data, which includes the reproduction information of the frames, is recorded into the writing file, the index data can be additionally written into the temporary index file.

If the temporary index file is existent, it is stored into the memory, and the data of the frames of the writing file is read. Therefore, even in the case of a data format in which a set of indexes is existent somewhere in a file, a real-time edition can be performed.

It should be noted that the term "moving image real-time edition" used herein means that while being recorded, moving image data is edited. Also, the meaning of the phrase "moving image data is caused to be recorded with frame IDs added thereto" naturally includes a case of storing the moving image data with each frame given a respective ID, but also includes a case of storing the moving image data in the frame sequence, as done in an exemplary embodiment that will be described later, resulting in a similar effect to the case where the moving image data is given frame IDs. Further, the meaning of the term "predetermined time intervals" used herein naturally includes constant time intervals but also includes irregular time intervals.

BEST MODE FOR CARRYING OUT THE INVENTION

1. General Structure

Figure 2:
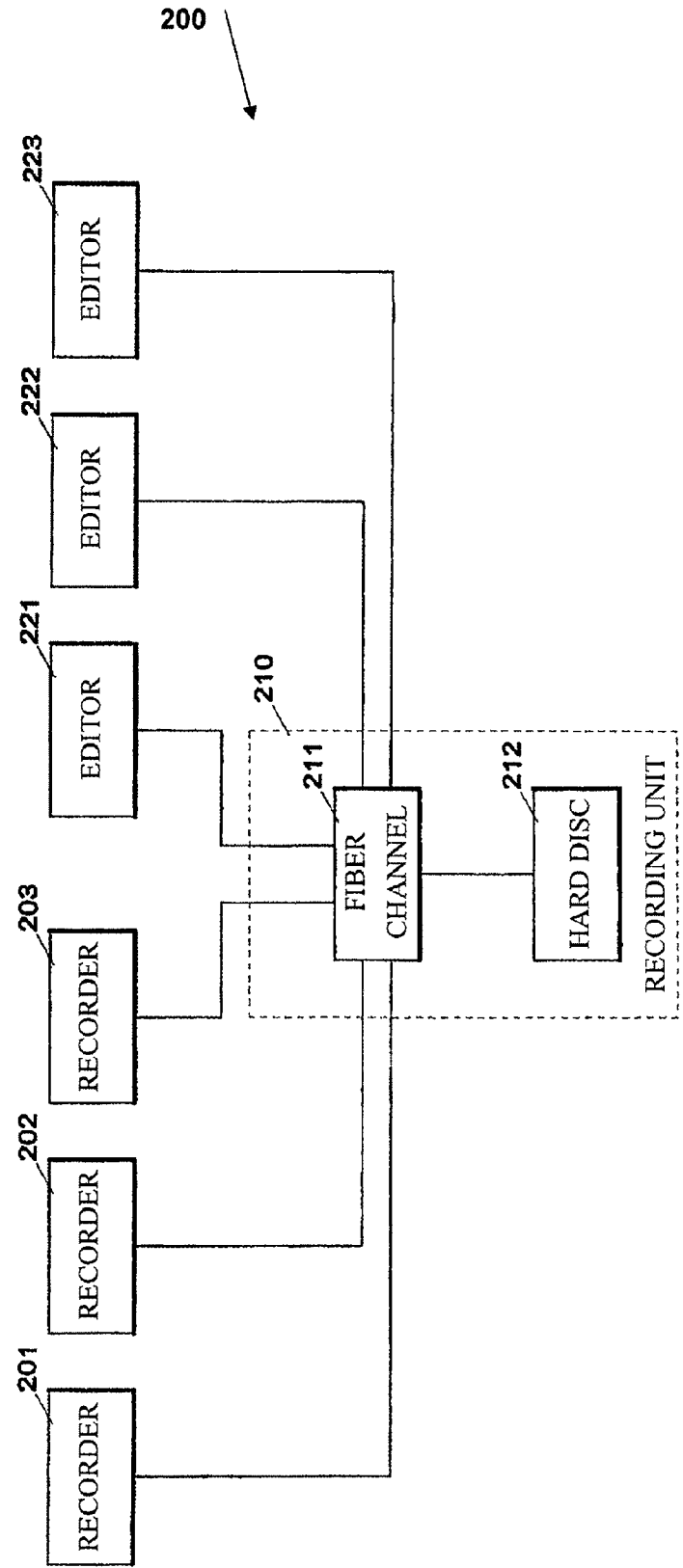
FIG. 2 is a schematic diagram illustrating the general structure of a moving image editing system 200.

FIG. 2 schematically illustrates the general structure of a moving image editing system 200 according to the present invention. The moving image editing system 1 comprises a plurality of recorders 201, 202 and 203, a plurality of editors 221, 222 and 223 and a recording unit 210. In this example, the recording unit 210 comprises a fiber channel 211 and a hard disc 212. The term "fiber channel" used herein refers to an interface that can support the multimedia age in which large amounts of data such as images are transferred between computers using an optical fiber cable or between a computer and its peripheral devices.

Each of the recorders 201-203 captures and records a moving image data into the recording unit 210 by use of a file format in which an index data including reproduction information of the data of the frames of a moving image data is written after that data of the frames. Further, when causing the recording unit 210 to determine a writing file name, open the file, add frame IDs to moving image data to be written as real data into the file, and record the moving image data, each of the recorders 201-203 opens a temporary index file associated with the writing file, and additionally writes the index data including the reproduction information of the transferred real data into the temporary index file at predetermined time intervals.

Each of the editors 221-223 reads and edits a file of the foregoing predetermined file format recorded in the recording unit 210. When each of the editors 221-223 reads the data of the writing file, if no index data of the frames is existent in the writing file, the editor searches for a temporary index file associated with the writing file. If the temporary index file is existent, the editor stores the temporary index file into a memory and reads the data of the frames of the writing file, and further examines, at predetermined time intervals, whether the index data has been additionally written in the temporary index file. If the index data has been additionally written therein, the editor updates the storage in the memory.

2. Functional Structures

Figure 3:
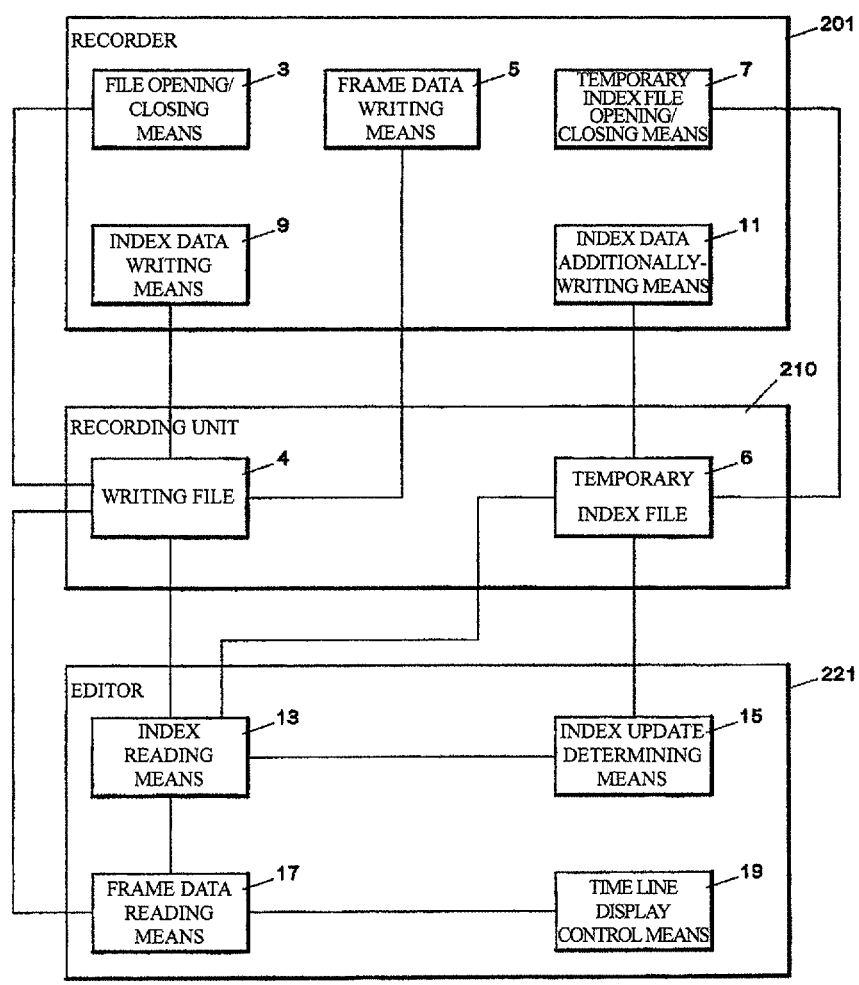
FIG. 3 is a function block diagram of the moving image editing system 1.

FIG. 3 illustrates function blocks of the recorder 201, recording unit 210 and editor 221 of FIG. 2. FIG. 3 illustratively describes only one of the recorders and only one of the editors of FIG. 2, but the same description is true with the other recorders 202 and 203 and editors 222 and 223.

The recorder 201 includes a file opening/closing means 3, a frame data writing means 5, a temporary index file opening/closing means 7, an index data writing means 9 and an index data additionally-writing means 11.

The file opening/closing means 3 causes the recording unit 210 to determine a writing file name and open a writing file 4. The frame data writing means 5 causes the recording unit 210 to record, in a frame sequence, moving image data to be written as real data into the writing file 4. The index data writing means 9 causes an index data, which includes reproduction information of the frames, to be recorded when the transferring of the final frame of the real data is completed. When the index data has been recorded, the file opening/closing means 3 closes the file. In this way, the recording of the AVI file of the foregoing writing file name is completed.

The temporary index file opening/closing means 7 opens a temporary index file 6 associated with the writing file when the recording unit 210 is caused to record the moving image data into the writing file in the frame sequence. The index data additionally-writing means 11 additionally writes, into the temporary index file 6, an index data including the reproduction information of transferred real data at predetermined time intervals. In this way, before the index data including the reproduction information of the frames is recorded into the writing file 4, the index data can be additionally written at the predetermined time intervals.

The editor 221 includes an index reading means 13, an index update determining means 15, a frame data reading means 17 and a time line display control means 19.

The index reading means 13 searches for the temporary index file 6 associated with the writing file 4 if no index data of the frames is existent in the writing file. If the temporary index file is existent, the index reading means 13 stores it into a memory. The frame data reading means 17 refers to the index data read into the memory and reads the data of the frames of the writing file 4. The index update determining means 15 determines, at predetermined time intervals, whether the index data has been additionally written into the temporary index file. If the index data has been additionally written, the index update determining means 15 updates the storage in the memory. The time line display control means 19 controls the display related to a time line for displaying and arranging, in a time sequence of reproduction, the frames to be edited. Also, the time line display control means 19 updates, based on the total number of the frames in the updated temporary index file, the display of the time line.

In this way, while the recorder 201 is recording the moving image data into the writing file 4 in the frame sequence, the editor 221 can refer to the temporary index file 6, thereby reading the frame data. Therefore, even in a case of a data format in which the set of indexes exist somewhere in the file, the real time edition can be performed.

3. Hardware Structures

3.1 Hardware Structure of Recorders

Figure 4:
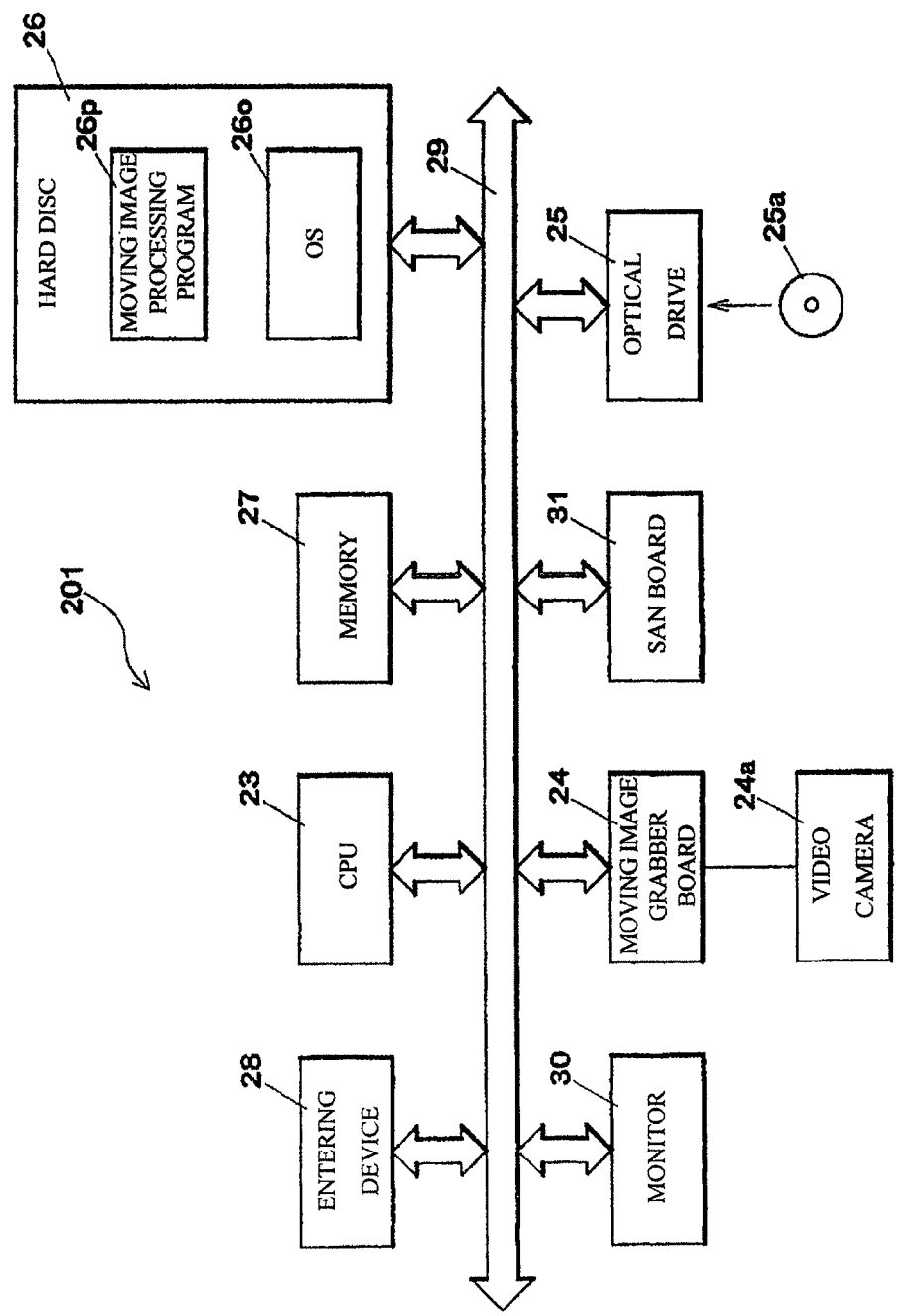
FIG. 4 is a diagram illustrating an exemplary hardware structure of a recorder 201 of FIG. 3 realized by use of a CPU.

The hardware structure of the recorder 201 shown in FIG. 3 will now be described with reference to FIG. 4. FIG. 4 illustrates an exemplary hardware structure of the recorder 201 using a CPU.

The recorder 201 includes the CPU 23, a memory 27, a hard disc 26, a monitor 30, an optical drive 25, an entering device 28, a moving image grabber board 24, a SAN board 31 and a bus line 29. The CPU 23 controls the other components via the bus line 29 in accordance with programs stored in the hard disc 26.

The hard disc 26 has stored an operating system program 26*o* (which will be referred to simply as "OS" hereinafter) and a moving image processing program 26*p*.

The moving image processing program 26*p* is a program for performing the moving image processings in the present apparatus. As will be described later, the moving image processing program 26*p* converts a digital data, which is supplied from the moving image grabber board 24, to an AVI file format and then writes the resultant into the recording unit 210. This will be described later in greater detail.

The present embodiment employs LINUX (which is a registered trademark or a trademark) as the operating system program (OS) 26*o*, but the present invention is not limited to this employment.

It should be noted that the foregoing programs are ones that are read from a CD-ROM 25*a*, in which those programs have been stored, via the optical drive 25 and then installed into the hard disc 26. It also should be appreciated that the programs may be installed from a computer-readable recording medium other than the CD-ROM, such as a flexible disc (FD) or an IC card, into the hard disc. It also should be appreciated that the programs may be downloaded by use of a communication line.

In the present embodiment, it is arranged that the programs be installed from the CD-ROM into the hard disc 26, thereby causing the programs stored in the CD-ROM to be indirectly executed by the computer. It, however, should be noted that the present invention is not limited to this arrangement and that it may be arranged that the programs stored in the CD-ROM be directly executed via the optical drive 25. It also should be noted that the computer-executable programs naturally include ones that can be directly executed only if installed as they are but also include ones that must be converted to different forms once (for example, a compressed form of data must be decompressed) and further include ones that must be combined with other module parts before their executions.

The moving image grabber board 24 is connected to a video camera 24*a*. When receiving a video data from the video camera 24*a*, the moving image grabber board 24 temporarily stores the received video data into the memory 27 and then subjects it to an A/D conversion. The data as digital-converted is then subjected, by the moving image processing program 26*p*, to a predetermined encoding process and other ones. The OS 26*o* determines a filename under which to record the data as processed, and then instructs, via the SAN board 31, the recording unit 210 to record the file having that filename. The SAN board 31 may be a typical host bus adapter (HBA).

3.2 Hardware Structure of Editors

Figure 5:
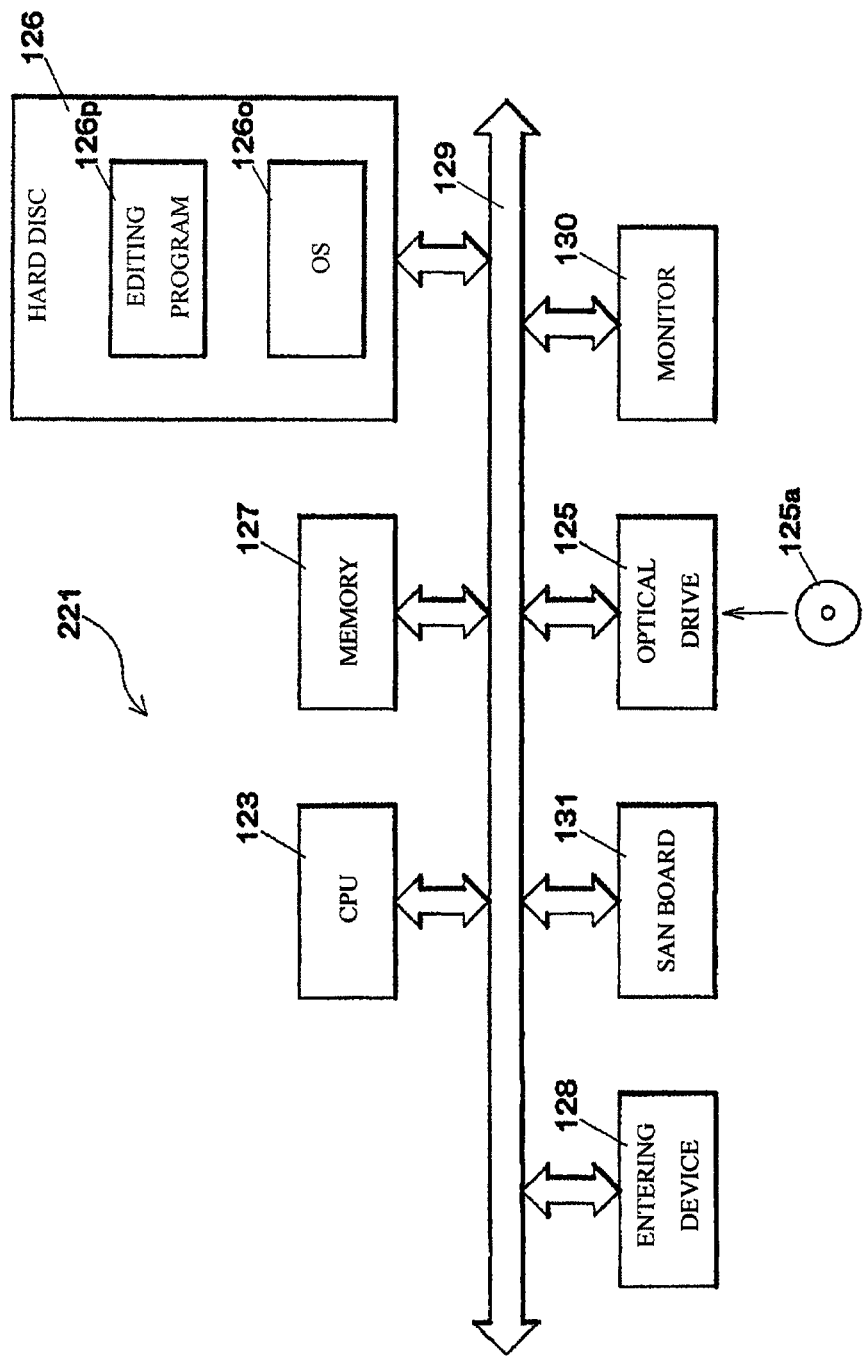
FIG. 5 is a diagram illustrating an exemplary hardware structure of an editor 221 of FIG. 3 realized by use of a CPU.

The hardware structure of the editor 221 shown in FIG. 3 will now be described with reference to FIG. 5. FIG. 5 schematically illustrates an exemplary hardware structure of the editor 221 using a CPU.

The editor 221 includes a CPU 123, a memory 127, a hard disc 126, a monitor 130, an optical drive 125, an entering device 128, a SAN board 131, and a bus line 129. The CPU 123 controls the other components via the bus line 129 in accordance with programs stored in the hard disc 126.

The hard disc 126 has stored an operating system program 126*o* (which will be referred to simply as "OS" hereinafter) and an editing program 126*p*.

The editing program 126*p* is a program for performing the moving image editions in the present apparatus. As will be described later, the editing program 126*p* refers to the temporary index file, thereby reading a moving image data even while the moving image data is being written into the writing file of the recording unit 210. This will be described later in greater detail.

The present embodiment employs LINUX (which is a registered trademark or a trademark) as the operating system program (OS) 126*o*, but the present invention is not limited to this employment.

It should be noted that the foregoing programs are ones that are read from a CD-ROM 125*a*, in which those programs have been stored, via the optical drive 125 and then installed into the hard disc 126. It also should be appreciated that the programs may be installed from a computer-readable recording medium other than the CD-ROM, such as a flexible disc (FD) or an IC card, into the hard disc. It also should be appreciated that the programs may be downloaded by use of a communication line.

In the present embodiment, it is arranged that the programs be installed from the CD-ROM into the hard disc 126, thereby causing the programs stored in the CD-ROM to be indirectly executed by the computer. It, however, should be noted that the present invention is not limited to this arrangement and that it may be arranged that the programs stored in the CD-ROM be directly executed via the optical drive 125. It also should be noted that the computer-executable programs naturally include ones that can be directly executed only if installed as they are but also include ones that must be converted to different forms once (for example, a compressed form of data must be decompressed) and further include ones that must be combined with other module parts before their executions.

The SAN board 131 is similar to the SAN board of the foregoing recorder and hence need not be described herein again.

4. Processings Executed by Programs

The processings executed by the moving image processing program 26*p* and editing program 126*p* will now be described with reference to FIGS. 6-11 in addition to FIGS. 4 and 5. The description that follows is directed to an exemplary case where while a file "V-1.AVI", which is a writing file from the recorder 201, is being written into the hard disc 212, it is edited from the editor 221. It should be noted that in this example, the writing is conducted under a rule that the extension of the temporary index file name associated with the writing file is "idx". It also should be noted that the capture time is not predetermined.

Figure 6:
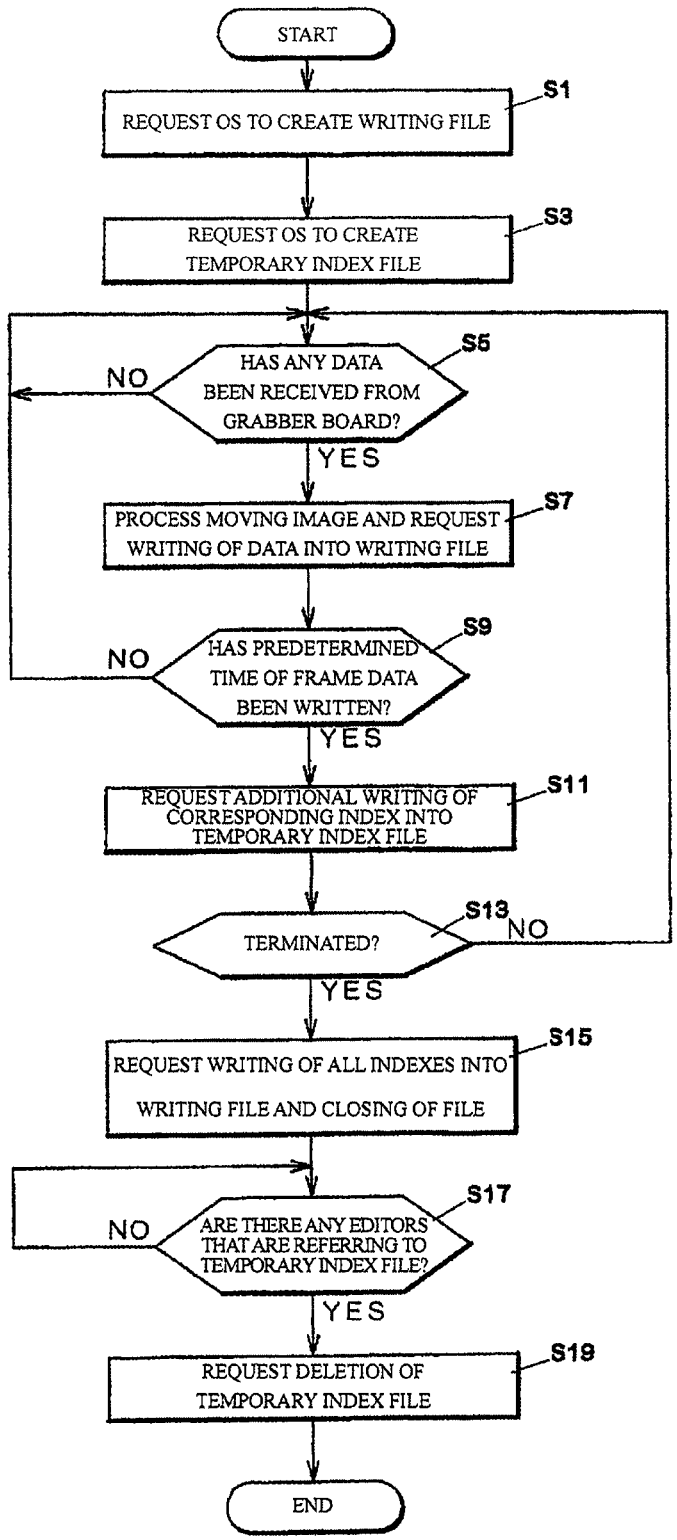
FIG. 6 is a flowchart of the recorder.
Figure 7:
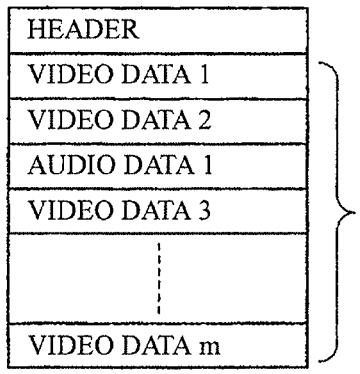
FIGS. 7A and 7B are diagrams each illustrating the correspondence between an AVI file and a temporary index file.
Figure 7:
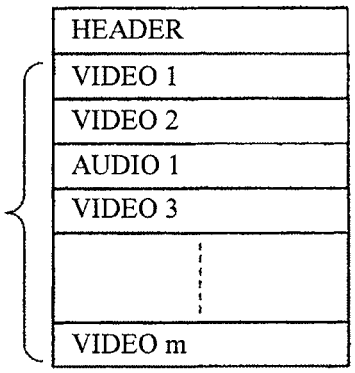
Figure 7:
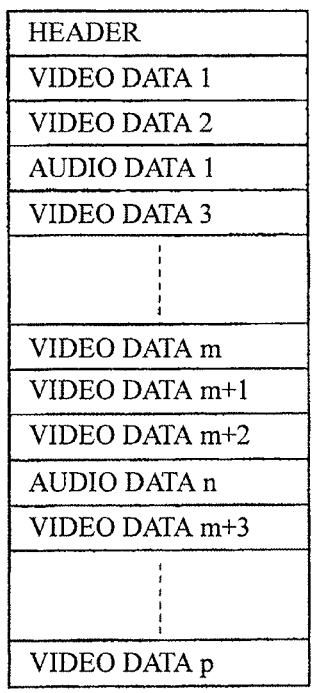
Figure 7:
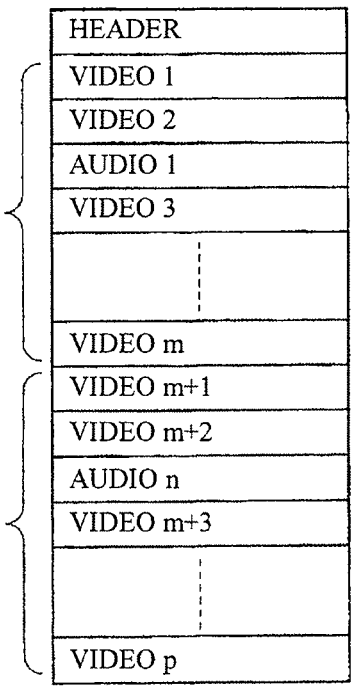

The moving image processing program 26*p* requests the OS 26*o* to create a file with a filename of "V-1.AVI" (step S1 of FIG. 6). The moving image processing program 26*p* further requests the OS 26*o* to create, as a temporary index file, a file with a filename of "V-1.idx" (step S3 of FIG. 6).

The moving image processing program 26*p* determines whether data has been received from the moving image grabber board 24 (step S5). If the data has been received therefrom ("YES" of step S5), the program 26*p* processes the moving image and requests the writing of the resultant data into the writing file (step S7). In this instance, since the writing file is the file "V-1.AVI", the OS 26*o* sequentially stores the frame data (video and audio data) into the file "V-1.AVI" in the hard disc 212.

The moving image processing program 26*p* determines whether a predetermined time of frame data has been written (step S9). If the predetermined time of frame data has not been written yet ("NO" of step S9), the program 26*p* repeats the processings of steps S5 and S7. If the predetermined time of frame data has been written ("YES" of step S9), the program 26*p* requests the OS 26*o* to additionally write a corresponding index into the temporary index file "V-1.idx" (step S11). In this way, the temporary index file associated with the AVI file being created is created as shown in FIG. 7A.

The moving image processing program 26*p* determines whether the capture is terminated (step S13 of FIG. 6). If not, the program 26*p* repeats the processings of steps S5-S11. Herein, the corresponding index is stored at time intervals of 20 seconds for the predetermined time of frame data. It should be noted that since, conventionally, the indexes corresponding to the written frames are temporarily stored in the memory such that they will be written in the end portion of the file, and hence the indexes stored in the memory are read and additionally written into the temporary index file.

On the other hand, the editing program 126*p* reads such 20 seconds of moving image data in a manner as follows. When the file "V-1.AVI" stored in the hard disc 212 is designated, as a file to be edited, by an operator of the editor 221, the editing program 126*p* determines whether the designated file includes any indexes (step S21 of FIG. 8). Specifically, the editing program 126*p* requests OS 126*o* to do that determination. In this instance, the file "V-1.AVI" is currently being written and no indexes are existent in the file. Therefore, the editing program 126*p* determines whether there exists any index file associated with the designated file "V-1.AVI" (step S23). In this instance, since the temporary index file has been created under the rule that a filename with the extension of "idx" is the associated one, the editing program 126*p* requests OS 126*o* to determine whether there exists the file "V-1.idx". In this instance, there exists the file "V-1.idx" and hence the editing program 126*p* requests the OS 126*o* to read that file (step S25).

By use of the index file "V-1.idx", indexes used for reading the frames of the file "V-1.AVI" to be edited can be acquired, so that the frame data can be read in a usual manner. Then, the edition can be executed in a usual manner.

Figure 8:
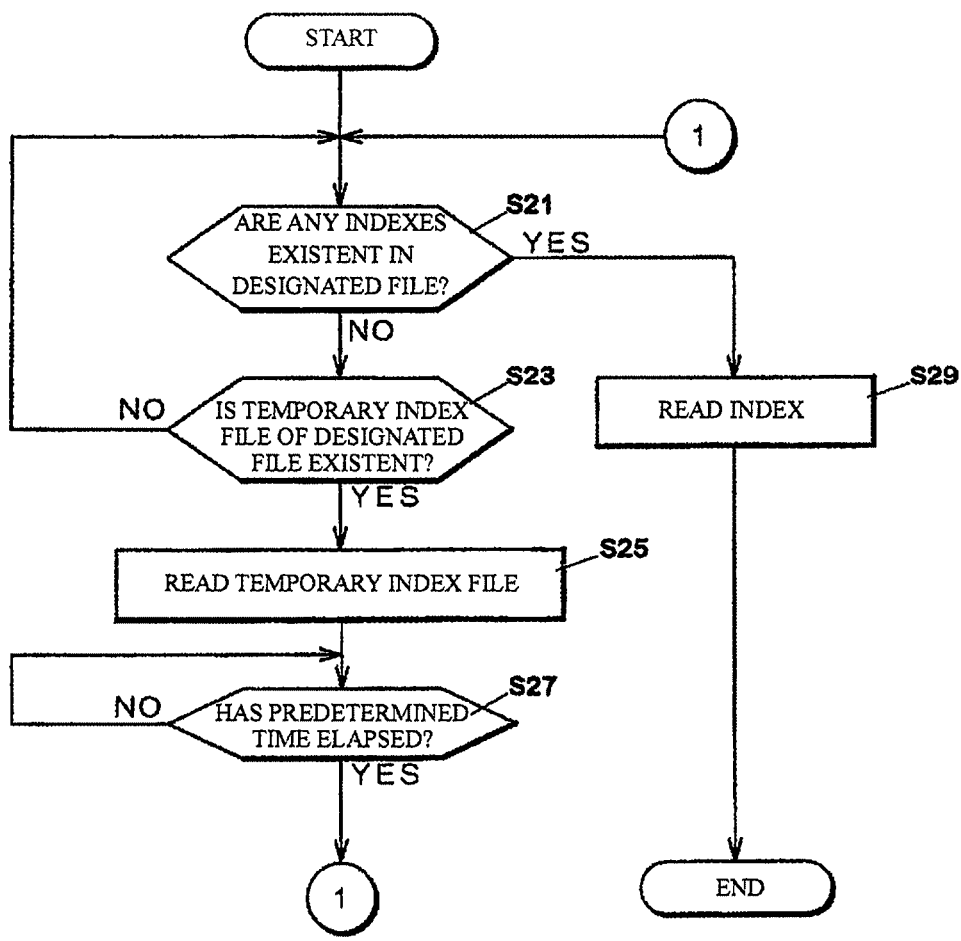
FIG. 8 is a flowchart of an index reading process in the editor.

The editing program 126*p* determines whether a predetermined time interval has elapsed (step S27 of FIG. 8). If the predetermined time interval has elapsed, the program 126*p* returns to step S21 and repeats it and the subsequent steps.

On the other hand, in steps S5 through S11 of FIG. 6, the moving image processing program 26*p* of the recorder 201 writes each predetermined time of frame data into the file "V-1.AVI", while causing a respective index, which corresponds to the index file "V-1.idx", to be additionally written into the temporary index file. In this way, as shown in FIG. 7B, video data m through video data p are stored into the AVI file, while video m through video p are additionally written as the corresponding indexes.

The operator of the editor 221 cannot know whether such new data has been added. Then, in order to allow the operator to know it, the editing program 126*p* changes the display of a time line as described hereinafter. Herein, the description that follows is directed to a case where indexes are additionally written into the index file after the occurrence of a state as shown in FIG. 10A. FIG. 10A illustrates a time line display in a case where no capture time has been prescribed. FIG. 10A shows that 19 seconds of frames plus 29 frames are arranged in a video clip (data) area 180 for a video clip "v01" and that the total time is 20 seconds. Also, a termination point park 171 is shown at the end of the frames. The same is true with an audio clip.

A time line display in a case where the capture time is prescribed will be described later.

The term "time line" refers to an edition area in which the frames of a video data read from a clip are arranged in a time sequence during a nonlinear video edition. The time line also includes an area in which audio data are arranged. In the present embodiment, an audio clip (data) area 181 and the video clip (data) area 180 are laid out on the time line.

Figure 9:
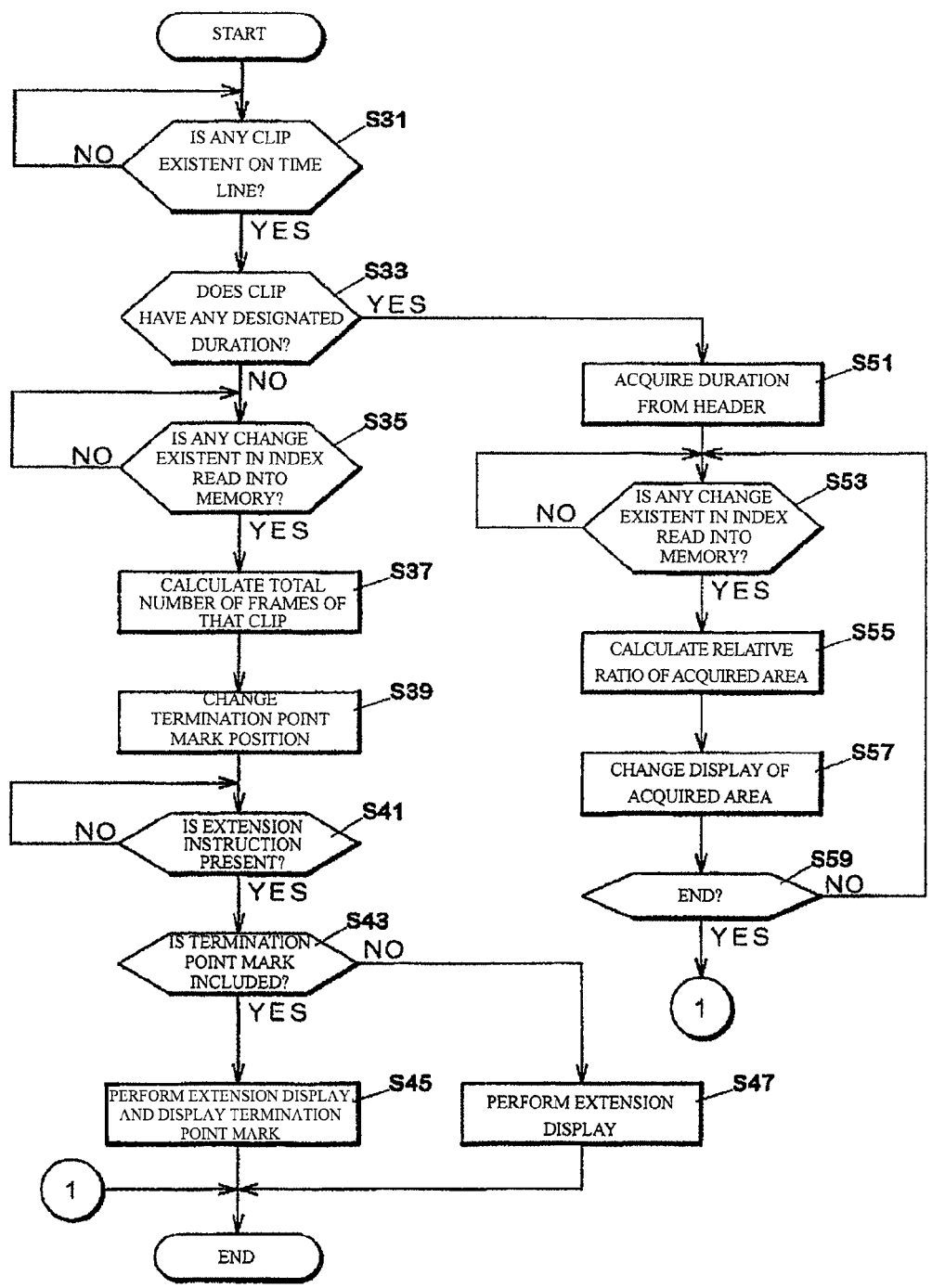
FIG. 9 is a flowchart of a time line displaying process in the editor.
Figure 10:
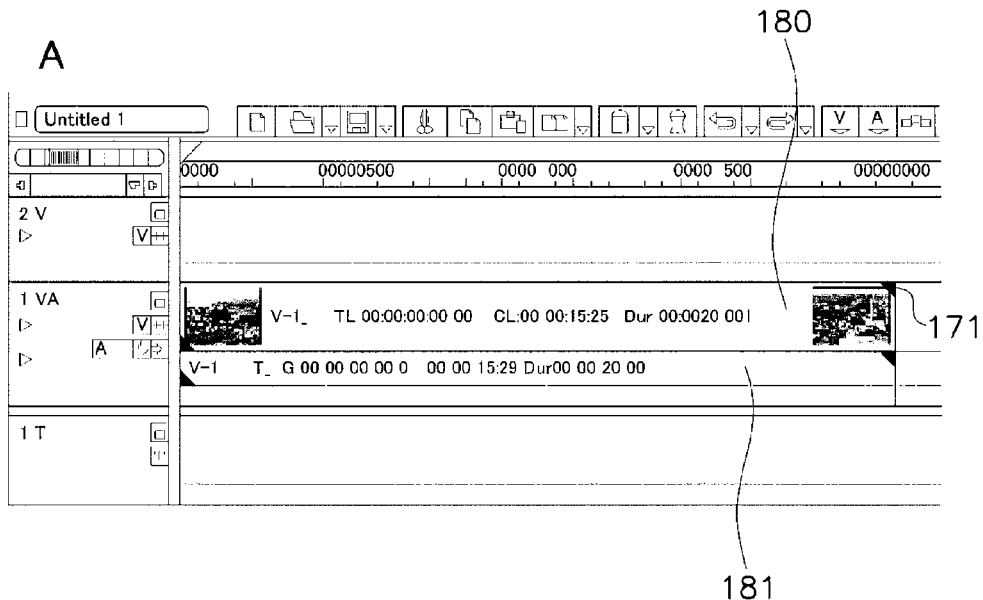
FIGS. 10A and 10B are diagrams each illustrating an exemplary display of the time line.
Figure 10:
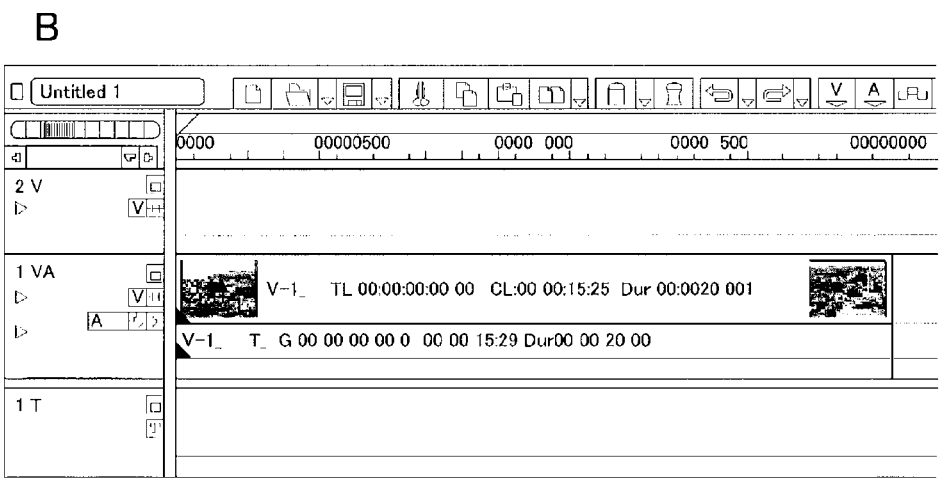

The editing program 126*p* determines whether there currently exists any clip on the time line (step S31 of FIG. 9). In this instance, there exists a clip, and hence the editing program 126*p* determines whether the clip has any designated duration (step S33). A duration data, which is a data indicating that the number of frames to be used for the capture is predetermined, is stored in the header of the writing file. During creation of the temporary index file, the foregoing duration data stored in the header is stored in the header of the temporary index file. The editing program 126*p*, therefore, refers to the header of the temporary index file to determine whether the number of frames to be used for the capture is predetermined.

Figure 11:
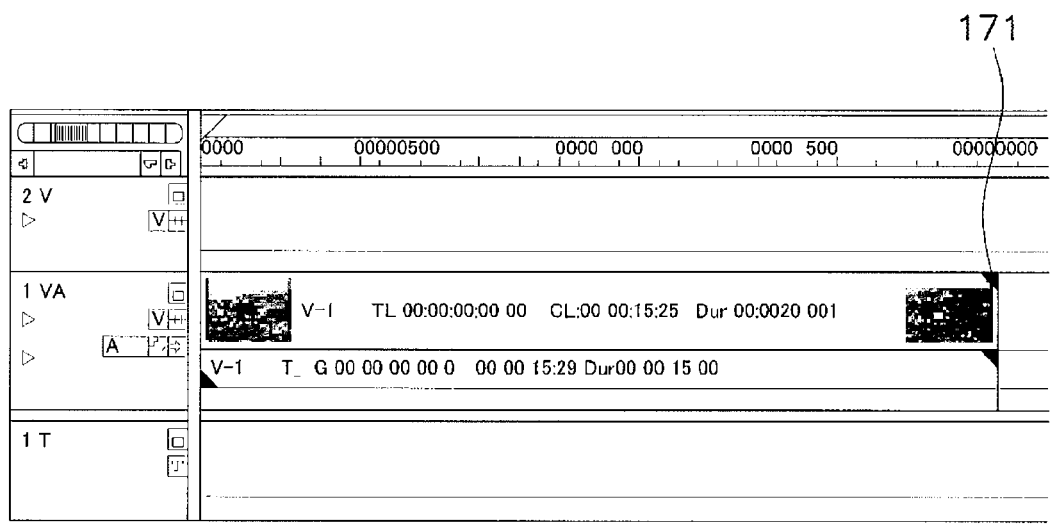
FIG. 11 is a diagram illustrating an exemplary display of the time line.

In this instance, the capture time period is not prescribed, and hence no duration data is existent. The editing program 126*p*, therefore, determines whether there exists any change in the index read into the memory (step S35 of FIG. 9). In step S25 of FIG. 8, when the additionally written index is read from the temporary index file "V-1.idx", there exists a change in the index read into the memory. The editing program 126*p* then calculates the total number of the frames from the index read into the memory (step S37). The editing program 126*p* then changes the position of the termination point mark in accordance with the calculated total number of the frames (step S39). As shown in FIG. 10B, the termination point mark disappears from the time line. Viewing the disappearance of the termination point mark, the operator determines that a new data has been captured. If this new data is to be read, the operator issues an extension instruction to extend the clip on the time line to the current total number of frames. The editing program 126*p* determines whether the extension instruction is present (step S41). If the extension instruction has been issued, the editing program 126*p* determines whether the position of the termination point mark is included in the extended area (step S43). In this instance, since there has been issued the extension instruction to extend the clip to the current total number of frames, the editing program 126*p* determines that the position of the termination point mark is included in the extended area, and then performs an extension display and displays the termination point mark 171 (step S45). The resultant state is shown in FIG. 11, in which five seconds of frames are added.

If, in step S43, the extension instruction is not such that the clip is extended to the current total number of frames, only the extension display is performed (step S47).

Thus, the editor allows its operator to refer to the AVI file in which the total number of frames may be regularly or irregularly increased. The operator of the editor can extend the clip on the time line so as to increase the number of frames to be edited. It should be noted that it may be arranged that the clip on the time line be automatically extended. This may be achieved by arranging that the clip be automatically extended when the position of the termination point mark is changed in step S39 of FIG. 9.

When all of the moving image data have been stored, the moving image processing program 26*p* of the recorder 201 requests the OS 26*o* to write all of the indexes temporarily stored in the memory into the AVI file and then close the file (step S15 of FIG. 6).

The moving image processing program 26*p* determines whether there exist any editors that are referring to the temporary index file (step S17). If no, the moving image processing program 26*p* requests the OS 26*o* to delete the temporary index file (step S19 of FIG. 6).

Figure 12:
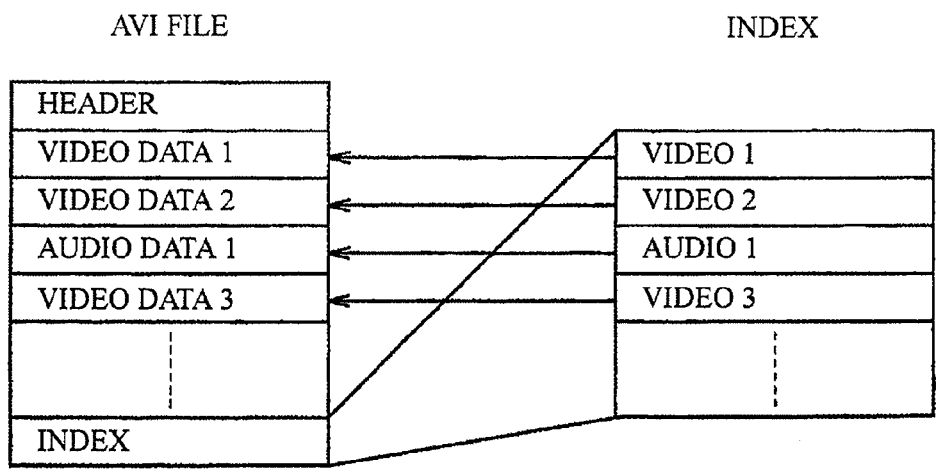
FIG. 12 is a diagram illustrating the data structure of the AVI file.

In this way, the AVI file is stored in a usual manner. FIG. 12 illustrates the data structure of the stored AVI file. Thus, a set of indexes is stored in the end portion of the AVI file. Therefore, if another editor 223 reads the AVI file in a usual manner after the completion of the AVI file, the indexes stored in the end portion of the file are read and then the data of the frames are read (steps S21-S29 of FIG. 8).

In this way, even while the recorder is capturing a moving image, the editor can edit the AVI file of the moving image.

Figure 13:
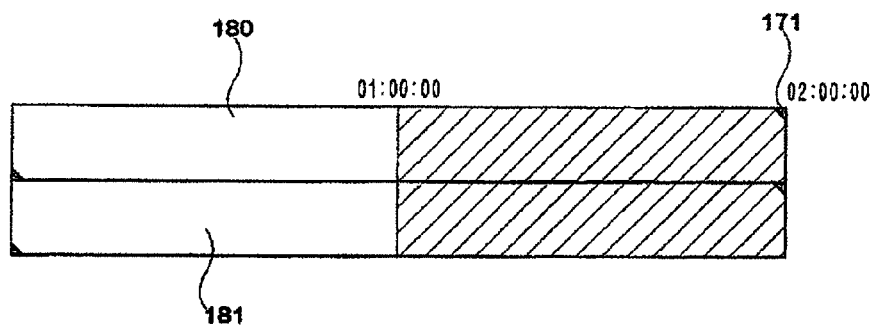
FIGS. 13A and 13B are diagrams each illustrating an exemplary display of the time line.
Figure 13:
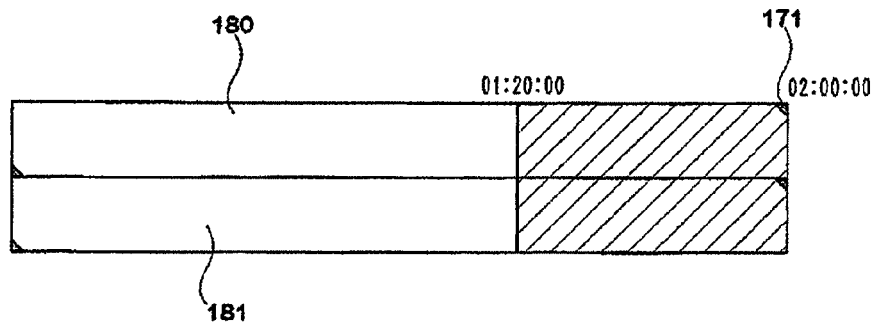

The time line display in a case where the capture time period is prescribed will now be described. In the description that follows, it is assumed that the capture time period is two minutes and that currently 60 seconds of data has been captured as shown in FIG. 13A and further 20 seconds of data will be captured. It should be noted that FIGS. 13A and 13B represent only the time lines of FIGS. 10A and 10B and that the portions that have not been captured yet are shown hatched.

In step S33 of FIG. 9, if determining that the clip has a designated duration, the editing program 126*p* acquires the duration from the header (step S51 of FIG. 9). The program 126*p* then determines whether there is any change in the index read into the memory (step S53). At this moment, since 20 seconds of data has been additionally written, the program 126*p* determines that there is a change in the index, and then calculates a relative ratio of acquired area (step S55). Specifically, the total number of the already captured frames is calculated from the index read into the memory and then divided by the total number of frames of the duration. Then, the program 126*p* changes the display of the acquired area (step S57). FIG. 13B illustrates a state in which the display of the acquired area has been changed. The program 126*p* determines whether there exists a mark, which is indicative of the end of the file, after the index (step S59). In this instance, since the file has not ended yet, and the program 126*p* repeats the processings of step S53 and the subsequent ones. It should be noted that if the index is read in step S29 of FIG. 8, the mark (e.g., EOF), which is indicative of the end of the file, is given after the index and hence this mark may be referred to. Alternatively, it may be determined whether the predetermined time of capture terminates.

Thus, if the duration has been designated, the termination point mark 171 is fixed. Therefore, it is arranged that both the area that has been acquired and the area that has not been acquired yet be additionally displayed to indicate a reading status in such a manner that the two areas can be clearly distinguished from each other, thereby allowing the edition to be performed even during the capturing process.

5. Other Embodiments

The description of the foregoing embodiment was directed to the case where the single editor was used to edit the single AVI file. However, one or more editors may be used to edit a plurality of AVI files.

In the foregoing embodiment, the display of the termination point mark was changed, thereby updating the display of the time line. However, a different way may be used to update the display of the time line. Further, not only the time line but also other appropriate means may be used to allow the operator to know that data has been added. Furthermore, not the display on the screen but sounds or vibrations may be used to allow the operator to know that data has been added.

In the foregoing exemplary embodiment, the recorder was connected to the video camera 24*a*. However, any other device that can supply a moving image data, for example, a video deck for commercial use, may be used instead of the video camera. Additionally, the present invention may be also applied to such a case that even if moving image data is supplied from a digital device, a compression scheme must be converted to another one and hence the moving image data must be decompressed once and thereafter compressed again.

In the foregoing exemplary embodiment, after all of the video data and audio data were transferred, the indexes were transferred again. However, since all of the indexes exist in the temporary index file, it may be arranged that they be additionally written into the AVI file.

In the foregoing exemplary embodiment, the temporary index file was created under the rule that a file having the same name with the extension of "idx" is the associated one. However, any other rule that allows the editors to identify the temporary index file may be used instead. Further, for example, uniquely identified temporary index filenames may be used for the respective recorders.

In the foregoing exemplary embodiment, the AVI file was described by way of example. However, any cases in which indexes are existent at a single location or at a plurality of locations have the same problem until the indexes are written into the file to be edited. The present invention may be equally applied to the cases of such file formats.

In the foregoing exemplary embodiment, the index data was additionally written at the predetermined time intervals. Such time intervals may be constant or irregular ones. Also, the predetermined time intervals at which to determine whether the index data has been additionally written into the temporary index file may be constant or irregular ones. Further, it may be arranged that it be always or continuously checked whether the index data has been additionally written into the temporary index file. Furthermore, it may be arranged that the OS of the recorders notify the editors' OS that the index data has been additionally written into the temporary index file.

In the foregoing exemplary embodiment, it was arranged that the temporary index file be created in the recording unit, and hence the recorders require no special management only if they cause the data to be written into the created temporary index file. The present invention is not limited to this arrangement. To put it briefly, what is needed is to arrange that the editors be able to refer to the indexes of an AVI file of moving image data currently being captured. It, therefore, may be arranged that an editor, which wishes to perform an edition, be able to receive the indexes of the AVI file, into which the moving image data is currently being written, from the recording unit in which the writing is currently being done. Thus, what is need is to arrange that when a moving image data is currently being recorded with frame IDs added thereto and a read request for reading the moving image data of the writing file is received from the editor, the index data including reproduction information related to the already written moving image data be transferred to the editor. In this instance, when such requests are received from a plurality of editors, the load of the recorders will be increased but need not create any temporary index files.

In the foregoing exemplary embodiment, it was arranged that the fiber channel be used to network-connect the hard disc. The present invention is not limited to this arrangement. To sum up, any means may be employed that only allows the image data written from one or more recorders to be read by one or more editors.

In the foregoing exemplary embodiment, the structure comprising the three devices, that is, the recorder, recording unit and editor was described. The present invention is not limited to this physical structure. However, it may be arranged that the recording unit be included in the recorder or in the editor. Alternatively, it may be arranged that a single device include all the functions of the foregoing three devices.

Figure 1:
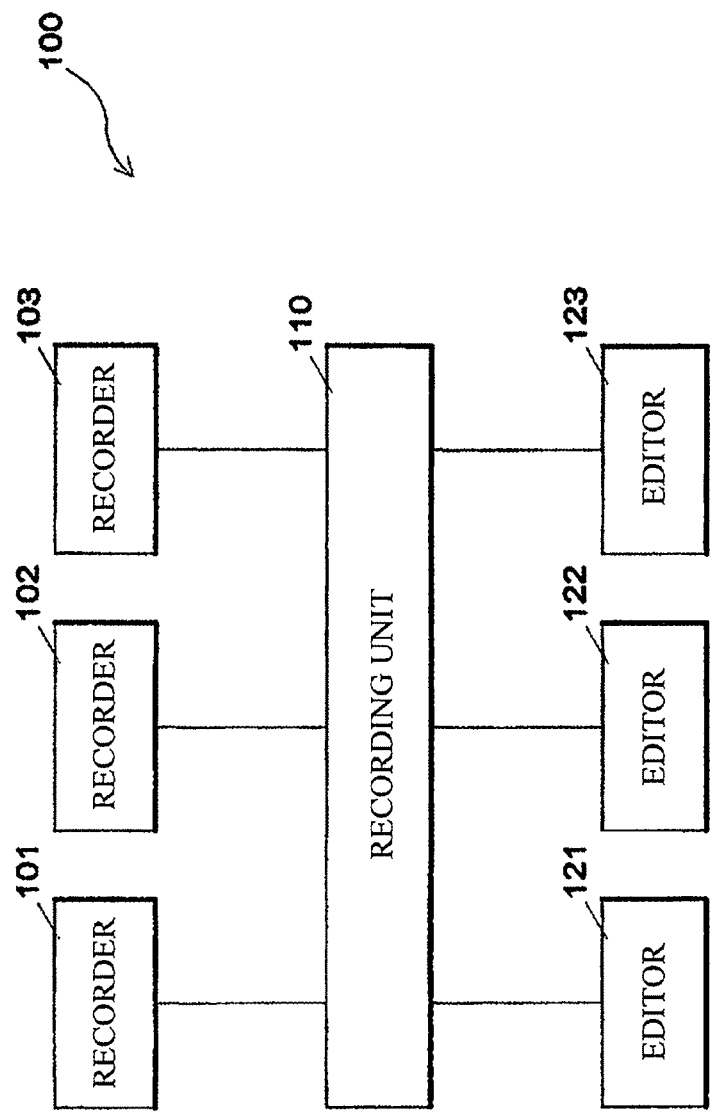
FIG. 1 is a diagram illustrating the general structure of a conventional AVI editing system 100.

In the foregoing exemplary embodiment, the CPUs were employed to achieve the functions shown in FIG. 1 by use of software. However, it may be arranged that a part or all of those functions be achieved by use of hardware such as logic circuits and the like.

It also may be arranged that a part of the processings of the foregoing programs be performed by the operating systems (OS).

INDUSTRIAL APPLICABILITY

This invention is applied to moving image editing technique.

The invention claimed is:

1. A moving image editing system comprising:
a storage apparatus;
a recording apparatus for recording moving image data from a video camera in a file in a predetermined format on the storage apparatus, and for writing, while the moving image data to the file is being recorded, index information for reproducing the recorded portion of the moving image data into a temporary index file, wherein the image data relates to a given time of audio video data in an audio video interleaving format and the index data is added to an end of real data; and
an editor enabling editing of the recorded portion of the moving image data based on the index information in the temporary index file, if the index file does not yet contain the index information in the temporary index file.

2. The moving image editing system according to claim 1, wherein said editor has a time line user interface for displaying the recorded portion of the moving image data in a time sequence updated dynamically as a function of the index information.

3. The moving image editing system according to claim 1, wherein said predetermined format is a file format in which index information for all the moving image data included in the file is located at the end of the file.

4. A recording apparatus for receiving moving image data from a video camera and recording the moving image data in a file in a predetermined format in a storage apparatus, and for writing, while the moving image data to the file is being recorded, index information for reproducing the recorded portion of the moving image data into a temporary index file, wherein the recorded portion of the moving image data can be edited based on the index information in the temporary index file, wherein the index information relates to a given time of audio video data in an audio video interleaving format and the index data is added to an end of real data and the editing is based on the information in the temporary index file if the index file does not yet contain the index information in the temporary index file.

5. The recording apparatus according to claim 4, wherein said predetermined format is a file format in which the index information for all the moving image data included in the file is located at end of the file.

6. An editor for editing moving image data, for editing a recorded portion of a moving image data from a video camera in a file while a remainder of the file is being recorded, wherein said editing is based on index information provided in a temporary index file by a recording device for updating said index information in the temporary index file as the moving image file is being recorded, wherein the index information relates to a given time of audio video data in an audio video interleaving format and the index data is added to an end of real data and the editing is based on the information in the temporary index file if the index file does not yet contain the index information in the temporary index file.

7. The editor according to claim 6, wherein
said editor has a time line user interface for displaying the recorded portion of the moving image data in a time sequence updated dynamically as a function of the index information in the temporary index file.

8. The editor according to claim 6, wherein said predetermined format is a file format in which index information for all the moving image data included in the file is located at the end of the file.

9. A method comprising the steps of:
receiving moving image data from a video camera;
recording the moving image data in a file in a predetermined format, wherein the predetermined formed is an audio video interleaving format using index data that related to a given time of audio video data;
writing, while the moving image data to the file is being recorded, additional index information for reproducing the recorded portion of the moving image data into a temporary index file, wherein the index information relates to a given time of audio video data and the index information is added to an end of real; and referring to the index information in the temporary index file to edit the recorded portion of the moving image data, if the index file does not yet contain the index information in the temporary index file.

10. The method according to claim 9, wherein said predetermined format is a file format in which index information for all the moving image data included in the file is located at the end of the file.

* * * * *